Inventors
Roger Dubusc
and Avram D. Iliovici
by Wilkinson & Mawhinney
Attorneys.

Inventors
Roger Dubusc
and Avram D. Iliovici
by Wilkinson & Mawhinney
Attorneys.

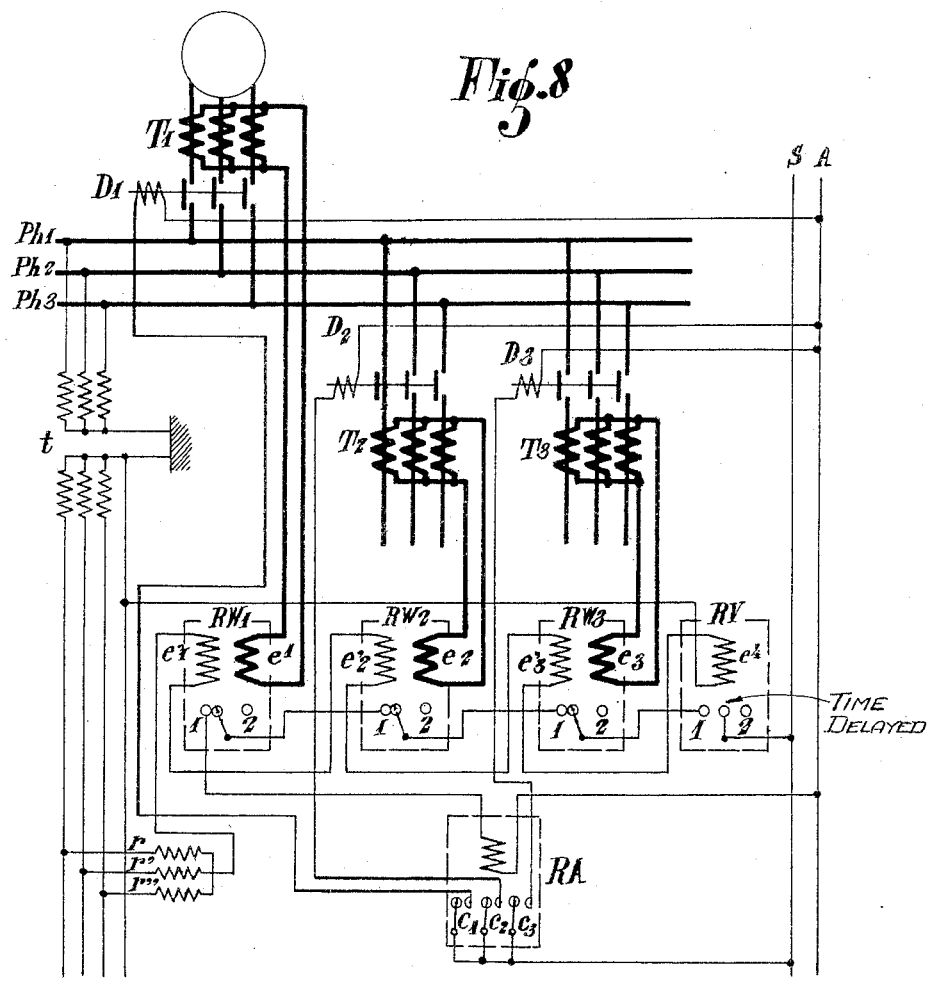
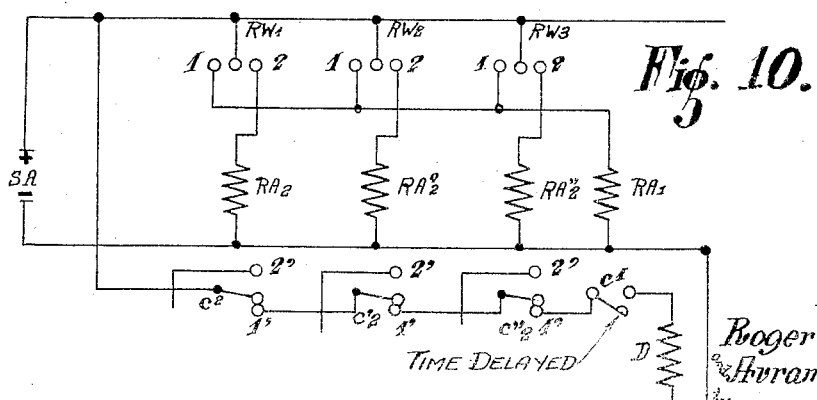

Patented Nov. 1, 1932

1,885,189

UNITED STATES PATENT OFFICE

ROGER DUBUSC AND AVRAM DAVID ILIOVICI, OF PARIS, FRANCE, ASSIGNORS TO COMPAGNIE POUR LA FABRICATION DES COMPTEURS ET MATERIEL D'USINES A GAZ, OF MONTROUGE, FRANCE, A JOINT-STOCK COMPANY OF FRANCE

CIRCUIT PROTECTING DEVICE

Application filed January 25, 1930, Serial No. 423,507, and in France February 6, 1929.

The present invention relates to a device for operating the circuit-breakers protecting an electrical network, for instance the bus-bars of a power station or substation.

In what follows, the term "knot" will be used to denote a restricted portion of a network at which a certain number of lines terminate. These lines are generally the bus-bars of a power station or substation.

Lines bringing current from alternators or transformers arrive at these bus-bars from which leave power distribution feeders or lines leading to transformers, motors and so on.

An object of the present invention is to protect such knots against contacts between wires or between a wire and earth.

According to the invention, in each line leaving a knot there is mounted a wattmetric relay operating responsive to the negative or zero phase sequence component of the power, said relay being either mounted directly in the line or through the medium of measuring transformers.

The current windings of the relays, or the current transformers which feed them, form a barrier separating the inside of the knot from the outside in which the alternators, transformers etc. are placed.

The object of the present invention is to protect the knot against any fault that may occur within the carrier indicated above, without the protecting devices being influenced by the faults occurring outside said barrier.

These and other objects of the present invention will become more clearly apparent from the following description taken in conjunction with the accompanying drawings wherein:

Figs. 1–5 inclusive illustrate circuit diagrams explanatory of the principle upon which the present invention is based.

Figure 6:
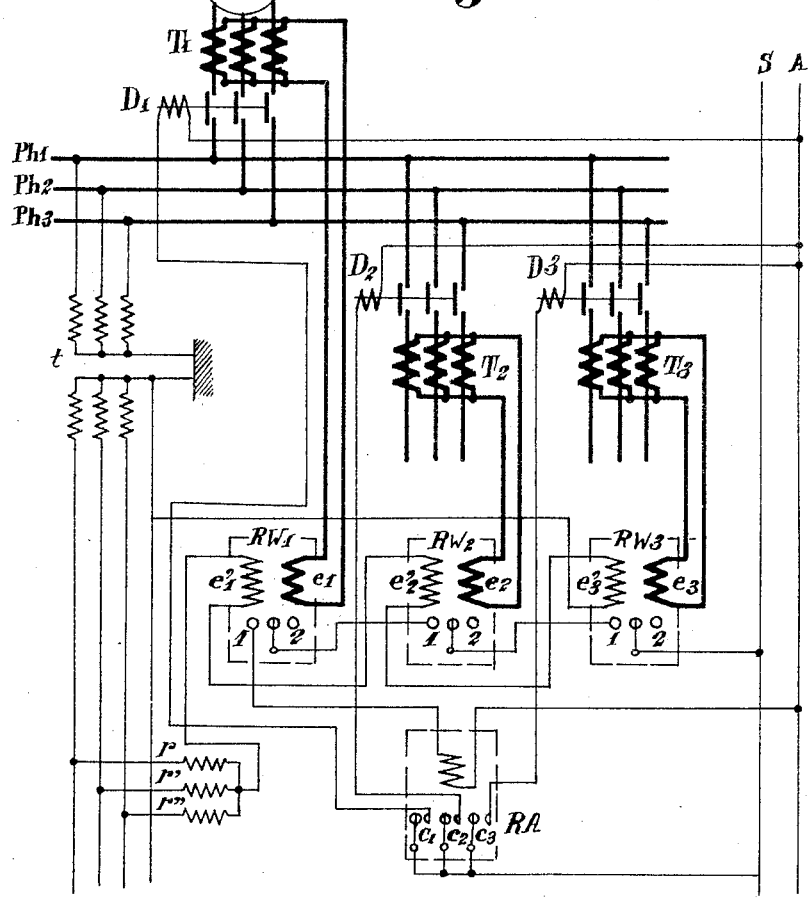

Fig. 6 illustrates one embodiment of the mounting of the wattmetric relays, and

Figs. 7–10 inclusive illustrate modifications of the circuit arrangement of Fig. 6.

Figure 1:
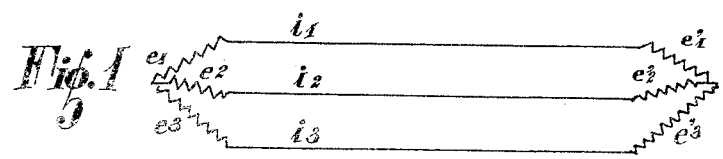

The present invention is based on the following consideration: when a fault occurs at a point in the network, the fault acts, according to the nature of the case, as a generator of the negative or zero phase sequence component of power or of both these phase sequence components together. In order to prove the truth of this statement, reference will be had to Figs. 1–5 inclusive. Fig. 1 shows a three-phase feeder system in which the currents $i_1$, $i_2$, $i_3$ flow, and at the respective ends of which are mounted generators having electromotive forces $e_1$, $e_2$, $e_3$, and receivers having E. M. F.'s $e'_1$, $e'_2$, $e'_3$. If a fault occur between two wires, it may be regarded as an impedance Z and the system then behaves in the manner shown in Fig. 2. If in the circuit AB a source of electromotive force $e$ of negligible resistance be mounted, and which is such that the current in the circuit AB is zero (Fig. 3), the same conditions as in Fig. 1 obtain, as far as the principal circuits are concerned.

Figure 2:
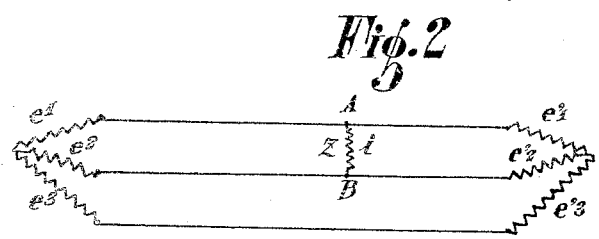
Figure 4:
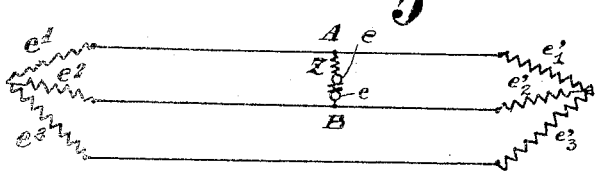

Conditions equivalent to those of Fig. 2 may be obtained by inserting in the circuit AB a fresh source of E. M. F. $(-e)$, equal to but contrary in sign to $e$. The circuit arrangement of Fig. 4 is consequently equivalent as regards the currents in the line wires and in the impedance Z to that of Fig. 2 for the electromotive forces $(-e)$ and $(e)$ mutually destroy their effects. These two electromotive forces have been introduced as a simple artifice of demonstration.

Figure 3:
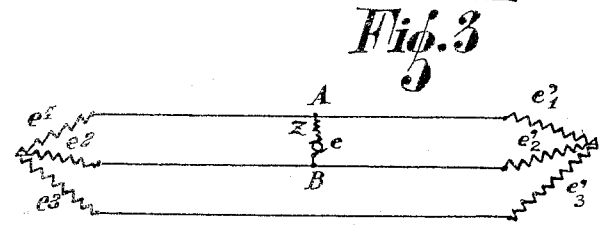
Figure 5:
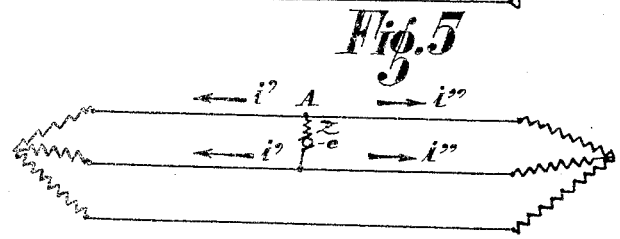

The instantaneous current which flows through each conductor of the circuit in the case of the circuit arrangement of Fig. 4 is the sum of the two currents flowing through the same wire respectively in the circuit arrangements of Figs. 3 and 5.

This follows from the fact that the Kirchhoff laws give equations of the first degree as regards currents and electromotive forces, for example $e_1$, $e_2$, $e_3$, $e'_1$, $e'_2$, $e'_3$ and $e$ of Fig. 3. If, then, without changing the resistances, reactances and capacitances, said electromotive forces be replaced by others, for example the electromotive force $(-e)$ of Figure 5, and then by the two groups of electromotive forces $e_1$, $e_2$, $e_3$, $e'_1$, $e'_2$, $e'_3$, $e$ and $(-e)$, as is the case in Figure 4, the current obtained in this latter case, in each conductor, is equal to the algebraic sum of the two currents obtained in the same wire in the circuit arrangements of Figs. 3 and 5. By hypothesis, the electromotive forces and the currents in the feeders are balanced in the circuit arrangement of Fig. 1 to which that of Fig. 3 is equivalent; furthermore, in Fig. 5 there is only one E. M. F. ($-e$) which is applied to a plurality of impedances; the source ($-e$) is thus necessarily a generator which supplies wattful and wattless power; said source being single phase, the power it supplies has a positive and a negative phase sequence component, but no zero phase sequence component since the resultant of the currents is zero.

In Figure 5, the sole current supply being the electro-motive force ($-e$) in the wire AB will cause currents of different values to flow in the circuits to the left and to the right of A, in view of the fact that said circuits have different impedances. If the respective currents flowing in the upper wires to the left and to the right of A, leading to the generating and receiving ends respectively, be designated $i'$ and $i''$, then the currents will return to B through the portions of the second wire lying to the left and right of B respectively while no current will flow through the third wire since its ends are at the same potential and since it contains no electromotive force. Hence in the wire BA a current $i'+i''$ will flow.

The object of Figures 1 to 5 is to explain that if a fault (contact between two line wires or between a wire and ground) occurs at a point of the network, everything happens as if at that point a generator were placed producing, according to circumstances, a negative or zero phase sequence power component, or both at once, said power flowing towards all portions of the circuit the impedance of which with respect to the power considered is not infinite.

When the two states of circuits of Figs. 3 and 5 are superimposed one on the other, the positive phase sequence component of the power supplied by ($-e$) combines with the power supplied or absorbed by the sources of E. M. F. $e_1$, $e_2$, $e_3$, and $e'_1$, $e'_2$, $e'_3$, which only contains said phase sequence component, the circuit being balanced; on the other hand, the negative phase sequence component of the total power is that of the source ($-e$).

Similar reasoning may be applied to the case of a fault between one of the line wires and earth, save that, in this instance, the power supplied by the source ($-e$) equivalent to the fault, contains a negative and a zero phase sequence component.

If a fault occur within the portion of the network protected by the relays, all the negative or zero phase sequence components of power in the various wires are directed from the inside to the outside of the barrier, that is to say, from the knot towards the transformers or the alternators, whereas if the fault occur outside the barrier, the power is directed in the faulty line from the outside towards the knot.

In the circuit arrangements illustrated in Figs. 6 to 10 inclusive, the contacts of the relays are so arranged that the circuit-breakers break the circuits which surround the knot when all the powers are directed outwardly, certain of which may be zero, and do not break the circuits if one at least of the powers is directed inwardly.

Turning now to Fig. 6, $Ph_1$, $Ph_2$, $Ph_3$ are the three bus-bars to be protected, from which leave three three-phase systems in which are mounted the circuit-breakers $D_1$, $D_2$, $D_3$ respectively and the groups of current transformers $T_1$, $T_2$, $T_3$. $RW_1$, $RW_2$, $RW_3$ are three wattmetric relays having voltage coils $e'_1$, $e'_2$, $e'_3$ and current coils $e_1$, $e_2$, $e_3$. Each of said wattmetric relays has a double contact designated 1, 2 while $t$ designates a group of three voltage transformers, the secondaries of which are star connected across three equal reactances $r$, $r_1$, $r_2$. SA is an auxiliary source which feeds an auxiliary relay RA when the contacts of the wattmetric relays contact to the left with 1. $c_1$, $c_2$, $c_3$ are contacts controlled by the relay RA.

The coils $e'_1$, $e'_2$, $e'_3$ of the relays $RW_1$, $RW_2$, $RW_3$ are fed with a current proportional to the earth voltage (resultant of the three currents flowing through $r$, $r_1$, $r_2$ which are proportional to the three phase voltages). The coils $e_1$, $e_2$, $e_3$ are fed respectively with the earth current, which in the case of $e_1$ is the resultant of the three currents of the transformers $T_1$, in the case of $e_2$ of the three currents of $T_2$ and in the case of $e_3$ of the three currents of $T_3$.

The relays are consequently responsive to the zero phase sequence component of the powers. When all the contacts of the relays are thrown over to 1, current flows through the winding of the relay RA, which then closes its contacts $c_1$, $c_2$, $c_3$ so that current flows through the windings of the circuit-breakers $D_1$, $D_2$, $D_3$ and said circuit-breakers consequently trip to break their respective circuits.

The contacts of the relays close to the left only when the zero phase sequence component of the power is directed outwardly, in other words in the case of an internal fault. Hence the circuit-breakers will operate when an internal fault occurs provided that there is an earth on one of the phases of the bus-bars or on one of the phases of the portions proximate to one of the feeders situated in front of the current transformers which feed the relays within the barrier formed by the transformers. On the other hand, in the case of an external fault, one of the relays, for example $RW_1$, if the fault lie in the line in which said relay is mounted, will move its contact to the right to 2 and the circuit of the auxiliary relay RA will remain open so that the contacts $c_1$, $c_2$, $c_3$ will not be actuated and the circuit-breakers $D_1$, $D_2$, $D_3$ will not be tripped.

The portions of the feeders lying between the bus-bars $Ph_1$, $Ph_2$, $Ph_3$ and the primaries of the current transformers $T_1$, $T_2$, $T_3$ are considered as forming part of said bus-bars. The barrier referred to above is therefore constituted by the primaries of said current transformers which separate the area pertaining to the bus-bars which we propose to protect with the devices according to the invention, from the portion outside said area which is protected by the relays protecting the feeders or electrical apparatus. Thus if a fault occur in the bus-bars or in the portions of the feeders situate between said bus-bars and the primary of one of the transformers $T_1$, $T_2$, $T_3$, our device will cause all the circuit-breakers $D_1$, $D_2$, $D_3$ to trip and the bus-bars will be cut off from the remainder of the network. If, on the contrary, the fault occur in a feeder or in one of the lines of the electrical machines at a point on the side of the primaries of the current transformers $T_1$, $T_2$, $T_3$, remote from the bus-bars, our device will not operate and other devices with which this invention is not concerned will have to trip the appropriate circuit-breaker.

Figure 7:
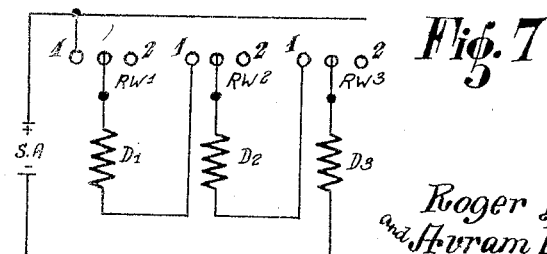

The auxiliary relay RA operating the contacts $c_1$, $c_2$, $c_3$ could be dispensed with and the simplified arrangement illustrated in Fig. 7 would be then obtained. In this case, a circuit through the windings of the circuit-breakers $D_1$, $D_2$, $D_3$ is established directly by the contacts of the wattmetric relays when all three are thrown over to the left to 1. On the other hand, when any one of said contacts is moved to the right to 2 due to the occurrence of an external fault on the corresponding line, the circuit of the windings of the circuit-breakers $D_1$, $D_2$, $D_3$ is broken.

The devices illustrated in Figs. 6 and 7 are only operative provided there is an earth on one of the lines arriving at or leaving the bus-bars.

If certain of these lines have no earths, an external fault will cause the power to enter by one at least of the barriers and one of the relays certainly will remain open; but, in the case of an internal fault, the zero phase sequence component of power will be nil in the lines without earths, and in this case the relays will not all close their contacts so that the circuit-breakers will not trip. Hence the device will not always operate correctly.

The device illustrated in Fig. 8 has been provided to obviate this drawback. This device is similar to that of Fig. 6, save that there has been added a voltmetric relay RV, the coil $e_4$ of which is connected in series with the voltage coils of the wattmetric relays $RW_1$, $RW_2$, $RW_3$. The contact of the voltmetric relay RV will close as soon as the voltages become unbalanced. Contrary to what obtains in the case of Fig. 6, in the device illustrated in Fig. 8, the contacts of the wattmetric relays $RW_1$, $RW_2$, $RW_3$ are normally closed being thrown over to 1. When the zero phase sequence component of power is directed outwardly, the contacts of the wattmetric relays tend to remain closed. Hence it will be seen that if a fault occur within the barrier, the wattmetric relays $RW_1$, $RW_2$, $RW_3$ will hold their contacts closed whether the zero phase sequence component of the power influences them or not; moreover, the voltmetric relay RV will likewise close its contact so that the circuit-breakers will trip. The relay RV is so designed as to have a greater time-lag than the wattmetric relays which may be instantaneous.

When a fault occurs outside the knot, the wattmetric relay of the defective line will open its contact before the voltmetric relay RV closes its contact; consequently the circuit of the relay RA and contacts $c_1$, $c_2$, $c_3$ will remain open and the circuit-breakers will not trip.

Figure 9:
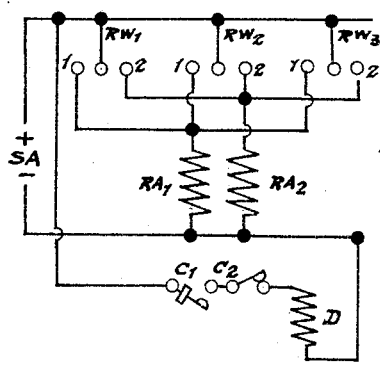

Instead of placing the contacts of the wattmetric relays in series, they might be placed in parallel as illustrated in Fig. 9, which shows a device operating with two auxiliary relays $RA_1$ and $RA_2$, the former of which tends to close its contact $c_1$ which is normally open, whereas the latter tends to open its contact $c_2$ which is normally closed. The left-hand contacts 1, 1, 1 of the wattmetric relays are connected in parallel to the auxiliary relay $RA_1$, whereas the right-hand contacts 2, 2, 2 are connected in parallel to the auxiliary relay $RA_2$.

In the case of each relay, when the zero phase sequence component of power is directed outwardly, the left contact closes; on the contrary, the right contact closes when the power component is of opposite sign.

It will be seen that if one at least of the wattmetric relays moves its contact to the left without any of the others moving their contacts to the right, current flows through the auxiliary relay $RA_1$ the contact $c_1$ closes and the circuit-breaker D trips. This occurs in the case of an internal fault. Of course there will be a circuit-breaker D for each feeder although only one has been shown in the drawings to avoid overcrowding.

On the other hand, in the case of an external fault, one at least of the relays moves its contact to the right and the auxiliary relay $RA_2$ opens its contact. If the time-lag of the relay $RA_2$ is less than that of $RA_1$, the former relay will have opened the contact $c_2$ before the contact $c_1$ has closed and the circuit-breaker will not trip.

Instead of using one auxiliary relay of the type $RA_2$, several may obtain, and in particular one for each of the wattmetric relays $RW_1$, $RW_2$, $RW_3$ as illustrated in Fig. 10.

Each of these auxiliary relays $RA_2$, $RA'_2$, $RA''_2$ may be provided with a second contact $2'$ which will close a circuit through a circuit-breaker (not shown) provided in the line, generator or transformer mounted therein to protect the latter against faults occurring outside the knot. The contacts $1'$ of the relays $RA_2$, $RA'_2$, $RA''_2$ are connected in series and the operation is similar to that of the device shown in Fig. 9.

The following considerations will show how the theorem illustrated by the circuit arrangements of Figures 1–5 inclusive may be applied to the practical devices disclosed in Figures 6 to 10. Taking for example, the case of Figure 6, it will be assumed that the generator represented by a circle, has its neutral point grounded and that the feeders in which are mounted the circuit breakers $D_2$ and $D_3$ feed power transformers, the star connected primaries of which have their neutral point grounded. Assuming now that a ground fault occurs at a point in a bus bar (for example, the bus bar $Ph_1$) situated between the alternator and the first feeder, according to the preceding theorem everything occurs as if a generator of wattless power were introduced, at the fault, between the bus bar and the ground. The power is directed towards the three grounds of the network; hence it flows in the circuit of the alternator and in the two feeders in the outward direction from the bus bars. The wattmetric relays $RW_1$, $RW_2$, $RW_3$ which are responsive to the wattless power due to the way in which they are mounted and the direction of deflection of which depends on the direction of flow of the wattless power, will deflect to the left and close the contacts 1, 1, 1. The current of the auxiliary source SA will flow through the coil of the auxiliary relay RA which will close the contacts $c_1$, $c_2$, $c_3$, thereby causing the current of SA to flow through the coils of the circuit breakers $D_1$, $D_2$, $D_3$. The latter will open their contacts and isolate the defective bus bars from the feeders of the alternator.

If, on the contrary, the fault occurs outside the bus bars, for example, in the feeder which includes the circuit breaker $D_2$ and below the primary of the current transformer $T_2$, the wattless power coming from the fault will flow directly towards the ground of feeder 2 without flowing through the primary of the transformer $T_2$, but another wattless power flows towards the grounds of feeder 3 and of the alternator. This power is directed towards the bus bars in the feeder 2 and towards outwardly directed bus bars in feeder 3 and in the circuit 1 of the alternator with the result that the relays $RW_1$ and $RW_3$ will close their contacts 1, 1 as in the previous case, whereas the relay $RW_2$ will close its contact 2. In these circumstances, the circuit containing the coil of the relay RA is broken in the relay $RW_2$, whereby the current SA is prevented from flowing through this coil and none of the circuit breakers will trip.

Thus selectivity between bus bar faults and feeder faults is obtained.

We claim:

1. In a protective system for the bus-bars of an alternating current supply system to which are connected a plurality of feeders, the combination of a plurality of relays, means fed from said bus-bars for making said relays responsive to one of the symmetrical phase sequence components of the power in said supply system, a plurality of circuit-breakers mounted in said feeders and adapted when tripped to isolate said feeders from said bus-bars, an auxiliary source of current, electrical means adapted to be energized by said auxiliary current source for operating said circuit-breakers, and a plurality of contacts controlled by said relays and adapted when closed by said relays to establish a circuit for the electrical means operating said circuit-breakers, one at least of said relays closing one of said contacts for a predetermined direction of said phase sequence component of the power, while none of said relays close any of said contacts for the opposite direction of said phase sequence component of power.

2. In a protective system for the bus-bars of an alternating current supply system to which are connected a plurality of feeders, the combination of a plurality of wattmetric relays, means, including current transformers mounted in said feeders, for making said relays responsive to one of the symmetrical phase sequence components of the power in said supply system, a plurality of circuit-breakers mounted in said feeders before said current transformers and adapted, when tripped, to isolate said feeders from said bus-bars, an auxiliary source of current, electrical means adapted to be energized by said auxiliary current source for operating said circuit-breakers, and a plurality of contacts controlled by said relays and adapted when closed by said relays to establish a circuit for the electrical means operating said circuit-breakers, one at least of said relays closing one of said contacts for a predetermined direction of said phase sequence component of the power, while none of said relays close any of said contacts for the opposite direction of said phase sequence component of power.

3. In a protective system for the bus-bars of an alternating current supply system to which are connected a plurality of feeders, the combination of a plurality of wattmetric relays, means, including current transformers mounted in said feeders, for making said relays responsive to one of the symmetrical phase sequence components of the power in said supply system, a plurality of circuit-breakers mounted in said feeders before said current transformers and adapted, when tripped, to isolate said feeders from said bus-bars, an auxiliary source of current, electrical means adapted to be energized by said auxiliary current source for operating the circuit-breakers, an auxiliary relay, a plurality of contacts controlled by said wattmetric relays and adapted, when closed by said relays, to establish a circuit through said auxiliary relay which is adapted, thereupon, to operate said circuit-breakers, one at least of said wattmetric relays closing its contact for a predetermined direction of said phase sequence component of the power, while none of said relays close their contacts for the opposite direction of said phase sequence component of power.

4. In a protective system for the bus-bars of an alternating current supply system to which are connected a plurality of feeders, the combination of a plurality of wattmetric relays, means, including current transformers mounted in said feeders, for making said relays responsive to one of the symmetrical phase sequence components of the power in said supply system, a plurality of circuit-breakers mounted in said feeders before said current transformers and adapted, when tripped, to isolate said feeders from said bus-bars, an auxiliary source of current, electrical means adapted to be energized by said auxiliary current source for operating the circuit-breakers, a plurality of contacts mounted in series and controlled by said wattmetric relays, said contacts when all closed by said relays establishing a circuit for the electrical means operating said circuit-breakers, said wattmetric relays closing their contacts only for a predetermined direction of said phase sequence component of the power.

5. A protective system according to claim 3, in combination with a voltmetric relay uninfluenced by the direction of the symmetrical phase sequence component of the power to which said relays are responsive, means for rendering said voltmetric relay responsive to one of the symmetrical phase sequence components of the voltage in said network, a contact normally open and adapted to be closed by said voltmetric relay when a fault occurs in the network, said wattmetric relays normally having their contacts closed while said voltmetric relay is timed to operate after said wattmetric relays whereby when a fault occurs outside said portion of the network to be protected, the contact of the wattmetric relay influenced by said fault will be opened before that of said voltmetric relay.

6. A protective system according to claim 3, in combination with a second set of contacts adapted to be closed by said wattmetric relays when a fault occurs outside the portion of said supply system to be protected.

7. In a protective system for the bus-bars of an alternating current supply system to which are connected a plurality of feeders, the combination of a plurality of wattmetric relays, means, including current transformers mounted in said feeders, for making said relays responsive to one of the symmetrical phase sequence components of the power in said supply system, a plurality of circuit-breakers mounted in said feeders before said current transformers and adapted when tripped, to isolate said feeders from said bus-bars, an auxiliary source of current, an auxiliary relay, means operated by said auxiliary relay when energized for closing a circuit for said circuit-breaker, a plurality of contacts closed respectively by said wattmetric relays for one direction of said symmetrical phase sequence component of power and each then establishing a circuit for energizing said auxiliary relay, a second auxiliary relay, a second series of contacts adapted to be closed respectively by said wattmetric relays for the opposite direction of said symmetrical phase sequence component of the power whereby a plurality of circuits in parallel is established for energizing said second auxiliary relay, and means operated by said second auxiliary relay when energized for opening the circuit of said circuit-breaker.

8. In a protective system for the bus-bars of an alternating current supply system, to which are connected a plurality of feeders, the combination of a plurality of wattmetric relays, means, including current transformers mounted in said feeders, for making said relays responsive to one of the symmetrical phase sequence components of the power in said supply system, a plurality of circuit-breakers mounted in said feeders before said current transformers and adapted when tripped, to isolate said feeders from said bus-bars, an auxiliary source of current, an auxiliary relay, means operated by said auxiliary relay when energized for closing a circuit for said circuit-breaker, a plurality of contacts closed respectively by said wattmetric relays for one direction of said symmetrical phase sequence component of the power, and each then establishing a circuit for energizing said auxiliary relay, a second series of contacts adapted to be closed by said wattmetric relays for the opposite direction of said symmetrical phase sequence component of the power, a plurality of additional auxiliary relays whose circuits are controlled by said second set of contacts, and means actuated by said plurality of additional auxiliary relays when energized for opening the circuit of said circuit-breakers and closing another circuit.

ROGER DUBUSC.
AVRAM DAVID ILIOVICI.